March 30, 1926.   E. L. McCAIN   1,578,538
KNIFE
Filed Feb. 18, 1924
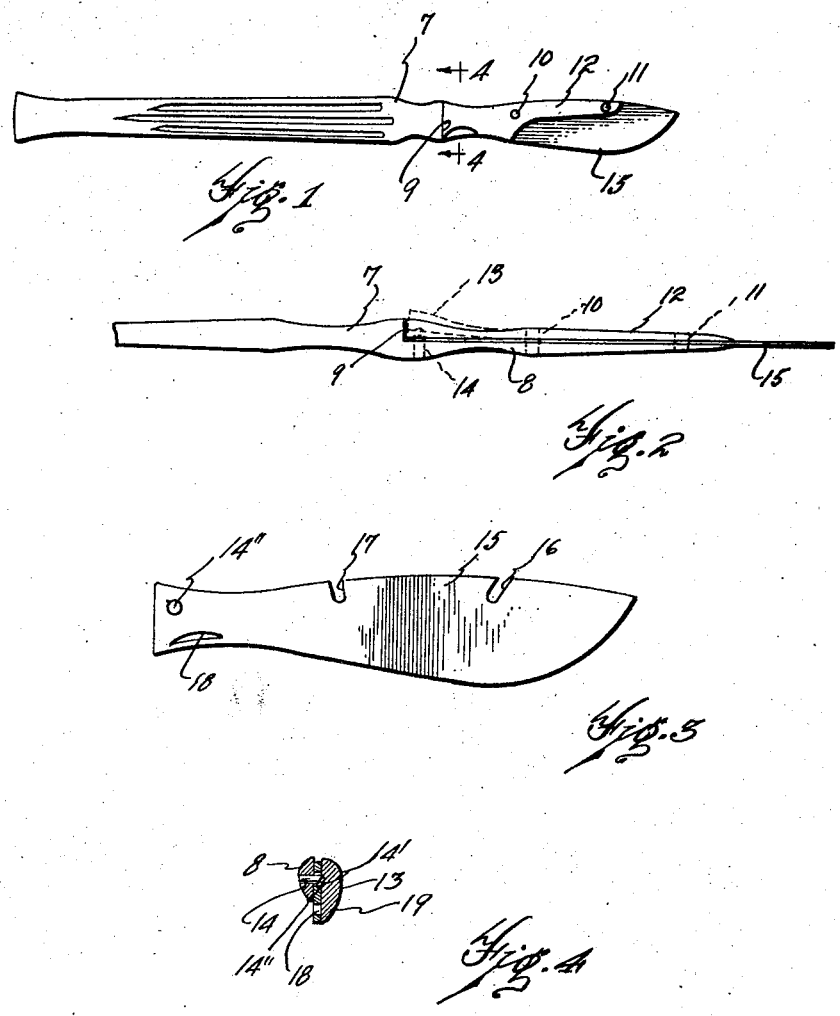
INVENTOR.
BY Ellsworth L. McCain
ATTORNEY.

Patented Mar. 30, 1926.

1,578,538

UNITED STATES PATENT OFFICE.

ELLSWORTH L. McCAIN, OF DETROIT, MICHIGAN.

KNIFE.

Application filed February 18, 1924. Serial No. 693,538.

*To all whom it may concern:*

Be it known that I, ELLSWORTH L. McCAIN, a citizen of the United States, residing at Detroit, in the county of Wayne and State of Michigan, have invented a new and useful Improvement in a Knife, of which the following is a specification.

My invention relates to a new and useful improvement in a knife especially adapted for use by surgeons, or those whose needs require a very sharp scalpel or knife and has as its object the provision of a knife of this class so constructed as to permit the ready removal and replacement of the blade.

Another object of the invention is the provision of a knife having a handle provided for engaging and retaining in position a removable blade, and having the edge of the shank of the blade free from engagement with the handle.

Another object of the invention is the provision of a knife of this class having the shank of the blade lying in the same longitudinal plane as the body of the blade.

Another object of the invention is the provision of an outwardly projecting reenforcing member adapted for lying along one side of the blade for reenforcing the same, and having another reenforcing member lying along the other side of the blade for reenforcing the same, said second mentioned reenforcing member being movable relatively to the blade adjacent one end.

Other objects will appear hereinafter.

The invention consists in the combination and arrangement of parts hereinafter described and claimed.

The invention will be best understood from a reference to the accompanying drawings which form a part of this specification and in which, Fig. 1 is a side elevational view of the invention, Fig. 2 is a top elevational view of the invention, Fig. 3 is a side elevational view of the blade used with the invention, Fig. 4 is a sectional view taken on substantially line 4—4 of Fig. 1.

The invention in its preferred form comprises a knife handle 7 having a forwardly extending reduced portion 8 adapted for reenforcing the blade used with the handle, this portion being adapted to lie along the blade so as to engage the blade in its entire width for a portion of its length, and extending the remaining portion along the upper edge of the blade. A shoulder 9 is formed at the point of juncture of the reduced portion with the main body of the handle. Rivets 10 and 11 serve to bind an additional reenforcing member 12 to the reduced portion of the handle, this additional reenforcing member being of similar shape and design as the reduced portion 8, and terminating at its outer end at the point of termination of the portion 8. This member 12 is held in spaced relation to the reduced portion 8 to permit the passage of the blade between them. The member 12 is free at its rear end, and yieldable enough to permit its being lifted to a greater spaced relation at this end to the portion 8.

Mounted in the portion 8, forwardly of the shoulder 9 is a stud 14 which projects slightly above the surface of the portion 8 and which is adapted to seat in a pocket 14' formed in the free end 13 of the member 12.

The blade used with the handle comprises a main body portion 15 having a slot formed in the upper edge thereof adjacent the forward end, said slot 16, being inclined toward the shank of the knife. Another slot 17 is formed toward the rear of the blade, at its upper edge, this slot 17 being of less depth than the slot 16 and being inclined toward the forward end of the knife blade. Formed on the blade adjacent its rear end is an opening 14" in which the stud 14 is adapted to project when the blade is mounted on the handle. Adjacent the rear end of the blade is formed a slot 18 in which the finger nail may engage for assisting in the removal of the blade. The reenforcing member 12 is provided with an enlargement 19 which is positioned opposite to the slot 18 when the blade is mounted on the handle.

In mounting the blade on the handle, the forward portion of the blade is placed between the members 8 and 12, so as to bring the rivet 11 into engagement with the slot 16. The blade is then swung until the rivet 10 is positioned in the slot 17. At the same time the opening 14" is brought into position where the stud 14 may project therethrough and engage in the pocket 14', thus securely locking the blade against a swinging movement. The slots 16 and 17 being oppositely inclined prevent the swinging of the blade outwardly from the handle on the shank of the blade as a center, so that the only way to remove the blade from the handle is to swing it on the forward portion as a center. In order to do this it is necessary that the end 13 of the member 12 be raised to clear the blade from the stud 14. When this is brought about the blade may then be swung outwardly to permit its removal. In raising the portion 13 clear of the stud 14 the finger nail may be engaged in the slot 18 and against the enlargement 19, so that as soon as the clearance desired is obtained, the blade will be engaged for the swinging movement.

It will be noted that the blade is reenforced throughout the major portion of its length, and that it lies flat throughout its length, when in operative position on the handle. It also is to be noted that the portion 13 does not engage against the shoulder 9, as a certain clearance is necessary to permit the raising of the portion 13. For the same reason the blade does not engage against the shoulder 9.

The particular type of blade shown in the drawings is but one of many designs used in surgery and it is clear that the shape or design of the blade has nothing to do with the operation of the invention so long as the features pointed out are present. With a handle as constructed it is apparent that a great rigidity is given the knife because of the lengthy reenforcement of the blade. When it is desired to use the handle a clean and sharp blade may be readily inserted in the handle and locked thereon ready for use. The handle is so constructed that a cleaning or disinfection of the same may be readily attained, through boiling or the use of creosote or in any other desirable manner.

While I have illustrated and described the preferred form of structure I do not wish to limit myself to the precise details of construction set forth but desire to avail myself of such variations and modifications as come within the scope of the appended claims.

Having thus described my invention what I claim as new and desire to secure by Letters Patent is:

1. A knife of the class described comprising a handle; a reenforcing member projecting therefrom and integral therewith; a second reenforcing member, extending along and spaced from said first mentioned reenforcing member; means for attaching said reenforcing members together; a separable blade having a plurality of notches formed in its upper edge adapted for the reception of said attaching means for mounting said blade on said handle; and means for locking said blade on said handle.

2. A knife of the class described comprising a handle; a reenforcing member projecting from said handle; a second reenforcing member extending along and spaced from said first mentioned reenforcing member; means for attaching said members together; a separable blade adapted for use with said handle, having a pair of slots formed in the upper edge thereof, one of said slots being inclined toward the rear of the blade and the other being inclined toward the front of said blade for the reception of said attaching means; and means adapted for projecting through an opening formed in said blade adjacent the rear thereof, for locking said blade in position on said handle.

3. A knife of the class described comprising a handle; a reenforcing member projecting from said handle; a second reenforcing member extending along and spaced from said first mentioned reenforcing member, said second mentioned reenforcing member having a pocket formed in the inner surface adjacent the rear end; means for attaching said members together; a separable blade adapted for use with said handle, having a pair of slots formed in its upper edge, one of said slots being adjacent the forward end of the blade and inclined toward the rear thereof, and the other of said slots being adjacent the rear of said blade and inclined toward the front thereof, said slots being adapted for the reception of said attaching means, and said blade being provided with an opening formed therein adjacent the rear end thereof; and a stud mounted in said first mentioned reenforcing member and adapted for projecting through said opening and into said pocket for locking said blade in position between said reenforcing members.

In testimony whereof I have signed the foregoing specification.

ELLSWORTH L. McCAIN.